United States Patent
Lawrie et al.

(10) Patent No.: US 7,069,696 B2
(45) Date of Patent: Jul. 4, 2006

(54) ASSEMBLY

(75) Inventors: Mark Graham Lawrie, Lion en Sulias (FR); Yann Le Gallo, Orleans (FR); Pascal de Vries, Sandillion (FR); Klaus B. Wilhelm Blume, Frankfurt (DE); Charles Berry Hopson, Lebanon, TN (US); Herve Laurandel, St. Claire (FR); Simon Blair Dobson, Kent (GB); Damien Cabanne, Fountainebleau (FR)

(73) Assignee: Meritor Light Vehicle Systems-France (FR)

( * ) Notice: Subject to any disclaimer, the term of this patent is extended or adjusted under 35 U.S.C. 154(b) by 691 days.

(21) Appl. No.: 10/010,739

(22) Filed: Dec. 6, 2001

(65) Prior Publication Data

US 2002/0095899 A1    Jul. 25, 2002

(30) Foreign Application Priority Data

Dec. 9, 2000    (GB)    ................................... 0030097.0

(51) Int. Cl.
*B60J 1/00* (2006.01)
*B60J 5/00* (2006.01)

(52) U.S. Cl. .......................... 49/349; 49/502; 29/897.2

(58) Field of Classification Search ............. 52/787.12, 52/506.07, 506.06, 506.1, 512, 463, 464, 52/484, 232, 311; 49/348, 375, 502, 349; 29/897.2

See application file for complete search history.

(56) References Cited

U.S. PATENT DOCUMENTS

| | | | | |
|---|---|---|---|---|
| 2,515,422 A | * | 7/1950 | Pietz ........................ | 267/141.7 |
| 3,128,999 A | * | 4/1964 | Schmitt ...................... | 267/153 |
| 3,702,041 A | * | 11/1972 | Podolan ....................... | 49/348 |
| 4,067,531 A | * | 1/1978 | Sikula ........................ | 220/378 |
| 4,367,660 A | * | 1/1983 | Becker et al. ................. | 74/625 |
| 4,788,795 A | * | 12/1988 | Pinsonneault ................. | 49/352 |
| 4,995,195 A | * | 2/1991 | Olberding et al. ............. | 49/118 |
| 5,022,184 A | * | 6/1991 | Yamamura et al. ............ | 49/352 |
| 5,121,534 A | * | 6/1992 | Kruzich .................... | 29/407.01 |
| 5,146,712 A | * | 9/1992 | Hlavaty ....................... | 49/118 |
| 5,243,785 A | * | 9/1993 | Nieboer et al. ............... | 49/375 |
| 5,251,370 A | * | 10/1993 | Muller et al. ................. | 29/512 |
| 5,482,344 A | * | 1/1996 | Walker et al. ............. | 296/39.1 |
| 5,498,091 A | | 3/1996 | Chan | |
| 5,531,046 A | * | 7/1996 | Kollar et al. ................. | 49/360 |
| 5,613,323 A | * | 3/1997 | Buening ...................... | 49/380 |
| 5,653,144 A | * | 8/1997 | Fenelon ....................... | 74/411 |
| 5,709,513 A | | 1/1998 | Tsai | |
| 5,724,769 A | * | 3/1998 | Cripe et al. ................... | 49/360 |
| 5,784,833 A | * | 7/1998 | Sponable et al. ............. | 49/360 |

(Continued)

FOREIGN PATENT DOCUMENTS

EP    1028015 A1    8/2000

(Continued)

OTHER PUBLICATIONS

European Search Report Dated Mar. 14, 2003.

(Continued)

*Primary Examiner*—Robert Canfield
(74) *Attorney, Agent, or Firm*—Carlson, Gaskey & Olds

(57) ABSTRACT

An assembly including a door panel, a window regulator housing component, and a window regulator drive system component. The door panel is secured to the window regulator housing component by a deformed portion to provide a subassembly. The deformed portion is utilized to releaseably secure the window regulator drive system component to the subassembly via a fourth component.

25 Claims, 3 Drawing Sheets

U.S. PATENT DOCUMENTS

| | | | |
|---|---|---|---|
| 5,822,922 A * | 10/1998 | Grumm et al. | 49/360 |
| 5,920,044 A * | 7/1999 | Kaji et al. | 200/61.44 |
| 6,021,605 A * | 2/2000 | Laux et al. | 49/361 |
| 6,026,611 A * | 2/2000 | Ralston et al. | 49/123 |
| 6,052,947 A * | 4/2000 | Smith | 49/352 |
| 6,099,291 A | 8/2000 | Lanser | |
| 6,119,401 A * | 9/2000 | Lin et al. | 49/361 |
| 6,398,582 B1 * | 6/2002 | Matsuyama et al. | 439/559 |
| 6,430,873 B1 * | 8/2002 | Borchuk et al. | 49/352 |
| 6,536,832 B1 * | 3/2003 | Grimm et al. | 296/146.6 |
| 6,560,929 B1 * | 5/2003 | Staser et al. | 49/362 |
| 6,588,152 B1 * | 7/2003 | Cabbane | 49/375 |
| 6,643,979 B1 * | 11/2003 | Schlatter | 49/352 |
| 6,655,092 B1 * | 12/2003 | Pacella et al. | 49/506 |
| 6,817,804 B1 * | 11/2004 | Le Gallo et al. | 403/408.1 |
| 2002/0040554 A1 * | 4/2002 | Blume et al. | 49/502 |
| 2004/0025441 A1 * | 2/2004 | Blume et al. | 49/506 |

FOREIGN PATENT DOCUMENTS

| | | |
|---|---|---|
| GB | 2 023 700 A | 1/1980 |
| GB | 2300031 A | 10/1996 |

OTHER PUBLICATIONS

Search Report Under Section 17 dated Mar. 7, 2001.

* cited by examiner

ASSEMBLY

BACKGROUND OF THE INVENTION

The present invention relates to assemblies, in particular assemblies having two components secured together by a deforming process, such as heat staking, mechanical deforming or methods using ultrasonics, and a further component.

In particular the invention is applicable to providing an assembly of a door panel, a window regulator housing and a window regulator motor of a land vehicle such as a car (automobile).

Many methods of securing components are known, amongst which is the technique of passing a thermoplastic protuberance from one component, through a hole in a second component and subsequently heating and upsetting the protuberance to form a rivet-like head and allowing the rivet like head to cool. This technique, is known, and is called heat staking. After cooling, a secure connection between the two components is established, the two components now forming a heat staked subassembly. However, the formation of the rivet-like head potentially obstructs the subsequent alignment and fitting of a further component to the heat staked subassembly.

SUMMARY OF THE INVENTION

An object of the present invention is to provide an improved assembly which enables a further component to be releaseably secured to and/or aligned with a subassembly.

Another object of the present invention is to provide an assembly wherein the components of the assembly can be aligned relative to each other.

Another object of the present invention is to provide an assembly wherein a deformed portion does not interfere with alignment or fitting of a further component.

Thus, according to the present invention there is provided an assembly including a first, second, and third component, the first component being secured to the second component by a deformed portion to provide a subassembly, in which the deformed portion is utilised to releaseably secure the third component to the sub assembly via a fourth component.

BRIEF DESCRIPTION OF THE DRAWINGS

The invention will now be described, by way of example only, with reference to the accompanying drawings in which.

DETAILED DESCRIPTION OF THE PREFERRED EMBODIMENT

Figure 1:
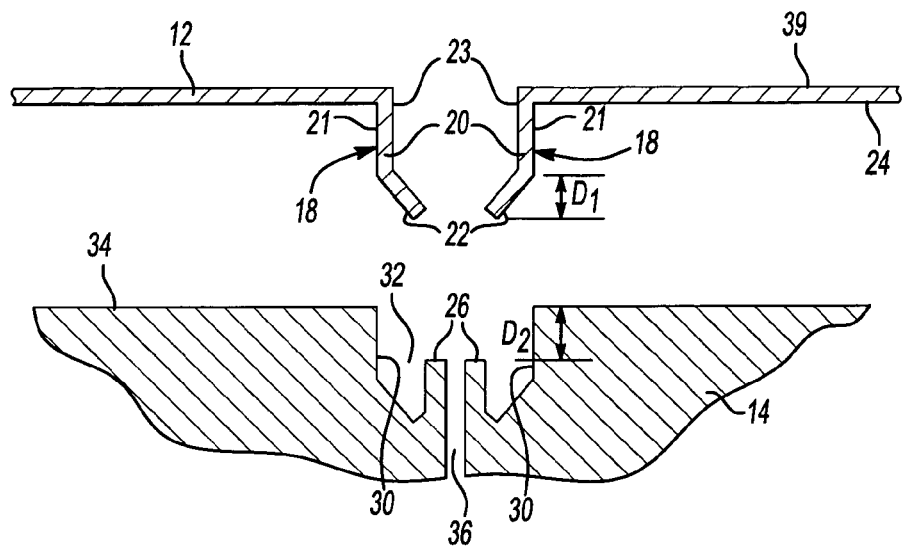
FIG. 1 is a schematic view of a door panel and a window regulator housing according to the present invention prior to assembly.

With reference to FIG. 1, there is shown a door panel 12 (also known herein as a first component) and part of a window regulator housing 14 (also known herein as a second component). The window regulator housing 14 might typically contain a drum around which has been wound a cable, rotation of the drum causing movement of the cable and hence raising or lowering of the window glass via separate components of the window regulator. Note that the present invention is not restricted to window regulators containing drums with cables.

The door panel 12 can be in the form of a door inner skin, i.e. a pressed component having various holes and attachments features for components such as door hinges, door latch, audio speakers, window regulator components etc. Alternatively, the door panel 12 can be in the form of a door module, i.e. a panel onto which is pre-mounted various components such as window regulator components, and audio speaker, a door latch etc. with this pre assembled door module being mounted in a relatively large aperture of a door inner skin. Alternatively, the door panel 12 can be a panel plate, such as a window regulator mounting plate, onto which parts of a window regulator are mounted.

Consideration of FIG. 1 shows that the door panel 12 includes a feature in the form of a protrusive part 18, the protrusive part including a cylindrical portion 20 and frustoconical portion 22. The protrusive part 18 has an inside surface 23 and an outside surface 21. The door panel 12 has an outer surface 24 and an inner surface 39.

The window regulator housing 14 includes a recess 32, the boundaries of the recess 32 defined by internal side wall 30 and a projecting cylinder 26, the internal side walls 32 having substantially the same form as the outside surface 21 of the protrusive part 18 of the door panel 12. The window regulator housing 14 has an inner surface 34.

Further consideration of FIG. 1 shows that the height of the projecting cylinder 26 is such so as to prevent the projecting cylinder 26 from engaging in the hole in the protrusive part 18 before the cylindrical portion 20 has engaged in the side wall 30 of the recess 32, i.e. the dimension $D_2$ is greater than the dimension $D_1$. This ensures that during assembly of the window regulator housing 14 and the door panel 12, the projecting cylinder 26 is not damaged by engagement with the frustoconical portion 22 of the protrusive part. It can be seen that the cylindrical portion 20 of the feature (protrusive part 18) engages side wall 30 (and hence aligns the first and second components) whilst the (pre deformed) cylinder 26 is remote from the frustoconical portion 22.

Figure 2:
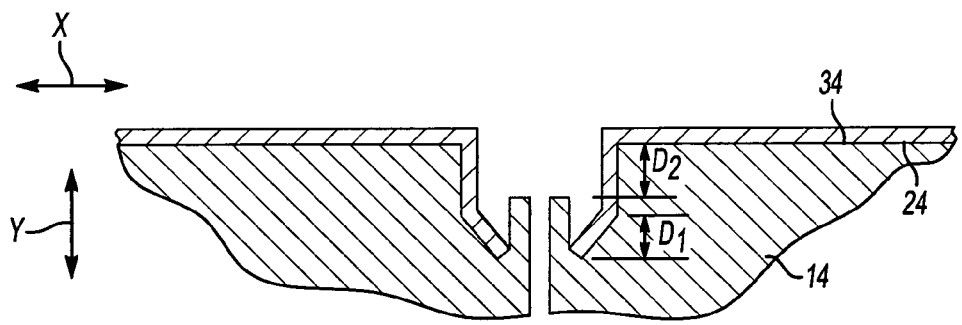
FIG. 2 shows the components of FIG. 1 after alignment.

It can be seen from FIG. 2 that the engagement between the recess 32 and the protrusive part 18 and the engagement between the inner surface 34 and the outer surface 24 provides alignment of the window regulator housing 14 and the door panel 12 in both the X, i.e. fore and aft, and Y, i.e. lateral, direction relative to the vehicle.

Figure 3:
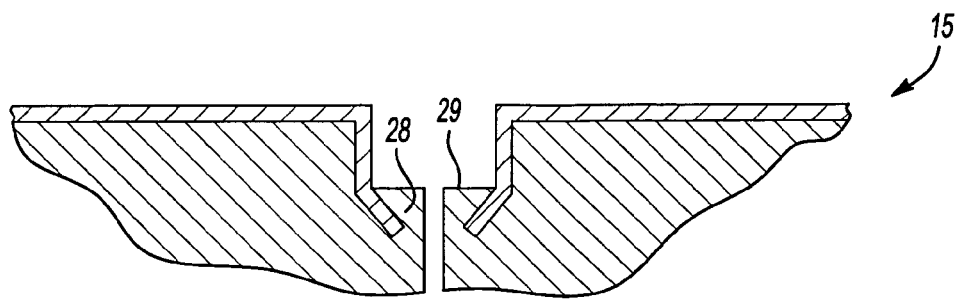
FIG. 3 shows the components of FIG. 2 after the application of heat an upsetting tool.

Consideration of FIG. 3 shows that it is possible to provide a deformed portion by applying both heat, and a suitable upset tool to the cylinder 26, which results in a heat staked portion 28 being formed in the recess 32. The heat staked portion 28 forms against the frustoconical portion 22 of the door panel 12, providing a secure and sealed connection between the window regulator housing 14 and the door panel 12. The connection of the door panel 12 and the window regulator housing 14 results in the formation of a subassembly 15.

The upset tool is configured such that the heat staked portion has a surface 29 which is substantially flat. The distance between the inner surface 39 of the door panel 12 and the flat surface 29 of the heat staked portion 28 is $H_4$.

The window regulator housing 14 has a second component hole, in the form of a through hole 36 concentric with the protrusive part 18 to allow for the passage of a fourth component (see FIG. 4A) as will be described further below.

Figure 4:
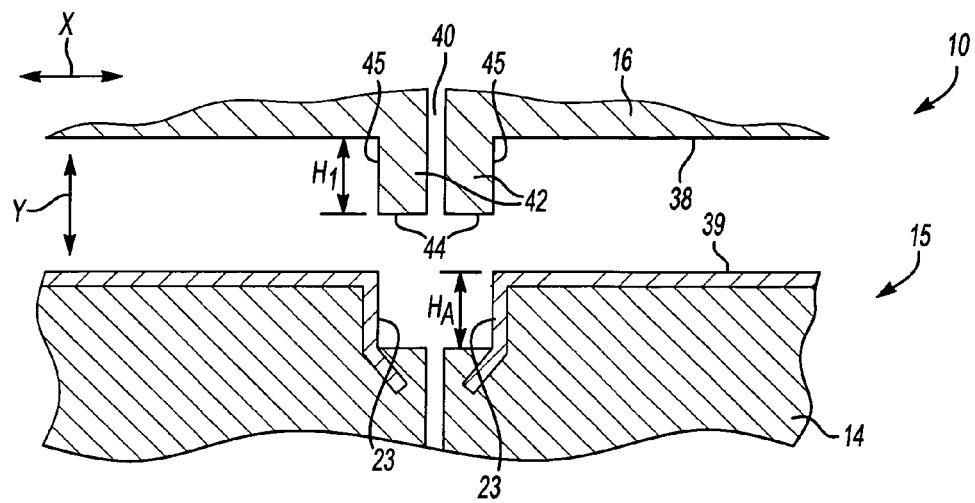
FIG. 4 shows the components of FIG. 3 and a window regulator motor.
Figure 4A:
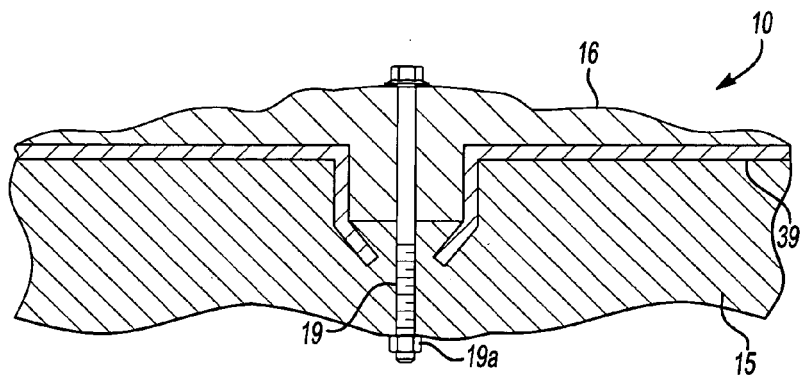
FIG. 4A shows the components of FIG. 4 after being releaseably secured by a fourth component.

FIGS. 4 and 4A show an exploded view of an assembly 10, which includes the subassembly 15 and a drive mechanism in the form of a window regulator motor 16 (also known herein as a third component). In further embodiments, the drive mechanism could be in the form of a manual window winder. The window regulator motor 16 has a cylindrical protuberant part 42, with an end surface 44 and a side surface 45. The window regulator motor 16 has an outer surface 38.

In this embodiment, the distance between the outer surface 38 and the end surface 44 of the protuberant part 42, is $H_1$ which in this case is equal to $H_4$, hence the end surface 44 is in contact with the flat surface 29 of the heat staked portion 28 and the outer surface 38 of the window regulator motor 16 is in contact with the inner surface 39 of the door panel 12.

Alignment in the Y direction is determined by contact between surfaces 44 and 29 and between surfaces 38 and 39, and is thus sensitive to any tolerances on the dimensions $H_1$ and $H_4$.

Consideration of FIG. 4 shows that alignment in the X direction between the window regulator motor 16 and the window regulator housing 14 is provided by cooperation between the internal side walls 30 and the outside surface 21 of the protrusive part 18 and also by co-operation between the inside surface 23 of the protrusive part 18 and the side surface 45 of the protuberant part 42.

A third component hole, in the form of a through hole 40 is located within the protuberant part of the window regulator motor 16, the hole 40 being aligned with the hole 36 of the window regulator housing 14.

With reference to FIG. 4A, the through hole 40 allows for the passage of the fourth component (which in this embodiment is in the form of a nut and bolt 19) of assembly 10 through hole 40 and hole 36. After passing the bolt through hole 40 and hole 46, the window regulator motor is then secured to the subassembly using the nut 19A. Thus the window regulator motor 16 can be removed and replaced using the nut, allowing possible replacement or repair.

It can be seen that it is the heat staked portion that is utilized by providing the hole through which the bolt passes to secure the window regulator motor 116 to the subassembly 115. It should be noted that in this embodiment, hole 40 and hole 46 are not threaded and are of equal diameter.

Figure 5:
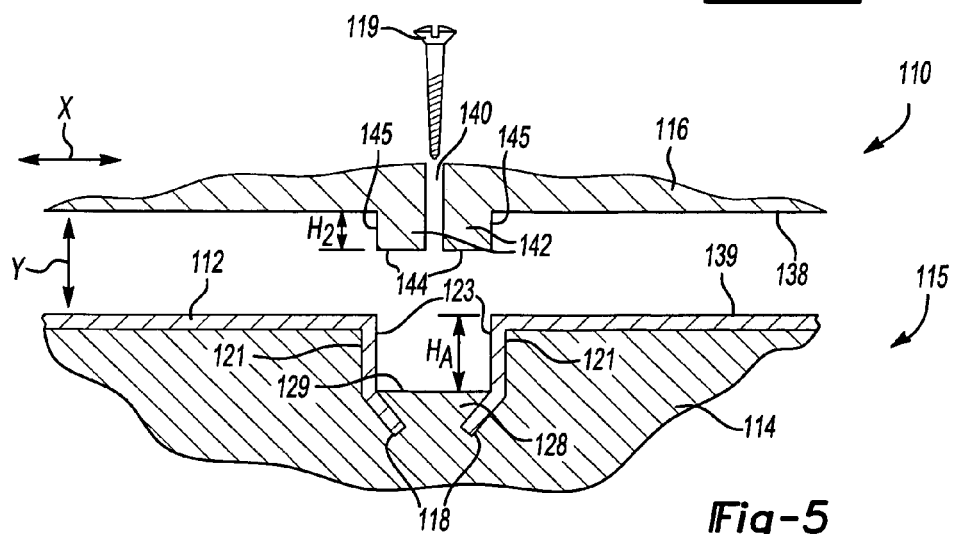
FIG. 5 shows a further embodiment of the present invention.

With reference to FIG. 5, there is shown an assembly 110 in which components that perform the same function as those in assembly 10 are labelled 100 greater. However in this case the protuberant part 142 has an end surface 144 and a side surface 145, with the distance between the end surface 144 and the outer surface 138 being $H_2$, which is less than $H_4$.

Alignment in the Y direction is determined by contact between the outer surface 138 and the inner surface 139, and there is no contact between the heat staked portion surface 129 and the end surface 144. Hence the alignment in the Y direction between the window regulator housing 114 and the window regulator motor 116 is only sensitive to tolerances on the thickness of the door panel 112.

Consideration of FIG. 5 shows that, as in the previous embodiment, alignment in the X direction between the window regulator motor 116 and the window regulator housing 114 is provided by co-operation between the internal side wall 130 and the outside surface 121 of the protrusive part 118 and also by co-operation between the inside surface 123 of the protrusive part 118 and the side surface 145 of the protuberant part 142.

Furthermore, in this embodiment, the window regulator housing 114 does not include a hole equivalent to hole 36. The window regulator motor 116 is secured to the subassembly 115 by the fourth component, which in this embodiment is a self tapping screw 119. Thus, the window regulator motor 16 can be removed and replaced using the self tapping screw, allowing possible replacement or repair. It can be seen that it is the heat staked portion that is utilized, by receiving the self tapping screw 119, to secure the window regulator motor 116 to the subassembly 115. Note in this embodiment, the only contact between the window regulator motor and the window regulator housing is via the self tapping screw.

In an alternative embodiment, the upset tool may be configured so as to provide a countersunk feature in the heat staked portion surface 129. This countersunk feature would then act to provide a lead-in for the self tapping screw.

Note that in other embodiments, the subassembly may include a hole, with the window regulator motor not including a hole, so that the self tapping screw passes through the heat staked portion of the subassembly and is received by the window regulator motor. The window regulator motor can therefore again be removed and replaced using the self tapping screw.

The accessibility to a particular side of the assembly 10 determines which of the subassembly and the window regulator motor includes the hole since access to the head of the self tapping screw is required. However, in later embodiments (FIG. 7) in which self tapping screws are described, both the subassembly and the window regulator motor may include holes.

Figure 6:
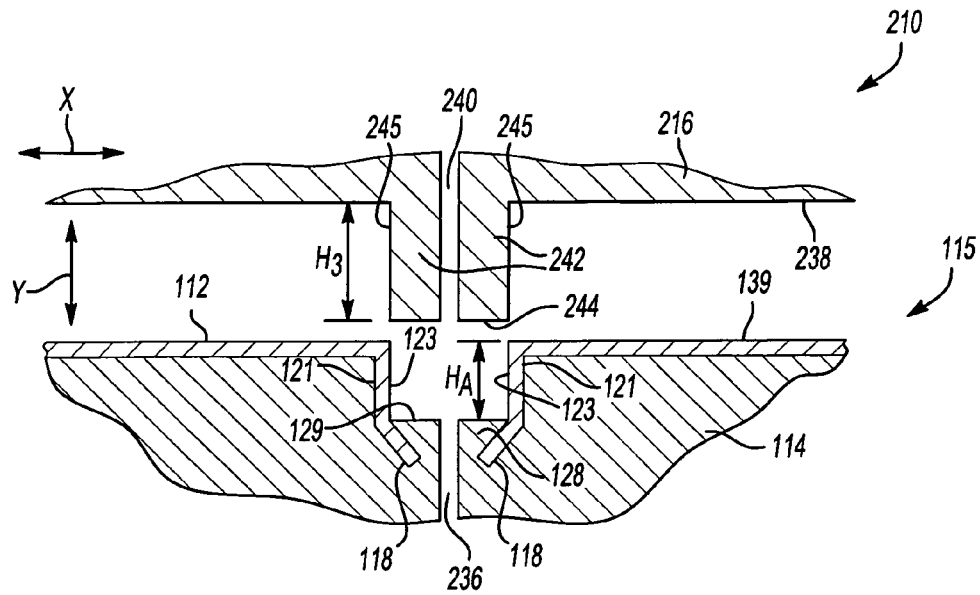
FIG. 6 shows a further embodiment of the present invention.

With reference to FIG. 6, there is shown an assembly 210 including the subassembly 115 of FIG. 5 and a window regulator motor 216 having an outer surface 238 and a protuberant part 242 which has an end surface 244 and a side surface 245. The distance between the end surface 244 and the outer surface 238 is $H_3$, which is greater than $H_4$.

Alignment in the Y direction is determined by contact between the heat staked portion surface 129 and the end surface 244, and there is no contact between the outer surface 238 and the inner surface 139. Hence, the alignment in the Y direction between the window regulator housing 114 and the window regulator motor 216 is not sensitive to tolerances on the thickness of the door panel 112.

Thus, it can be seen that the window regulator motor co-operates with the heat staked portion to provide alignment in the Y direction between the window regulator motor and the window regulator housing.

Consideration of FIG. 6 shows that, as in the previous embodiment, alignment in the X direction between the window regulator motor 216 and the window regulator housing 114 is provided by co-operation between the internal side wall 130 and the outside surface 121 of the protrusive part 118 and also by co-operation between the inside surface 123 of the protrusive part 118 and the side surface 245 of the protuberant part 242.

In this embodiment, the subassembly 215 includes a hole 236, and the window regulator motor 216 includes a hole 240. The subassembly and the window regulator motor are secured using a fourth component in the form of a bolt (not shown in this embodiment), the bolt passing through hole 240 and screwing into the threaded hole 236, so as to releaseably secure the window regulator to the subassembly.

Note that in other embodiments, hole 240 may be a threaded hole, with the bolt passing through hole 236 and screwing into the threaded hole 240, so as to releaseably secure the window regulator to the subassembly.

As in the embodiment described in FIG. 5, the accessibility to a particular side of the assembly 210 determines which of the subassembly and the window regulator motor holes is threaded since access to the bolt head is required.

Figure 7:
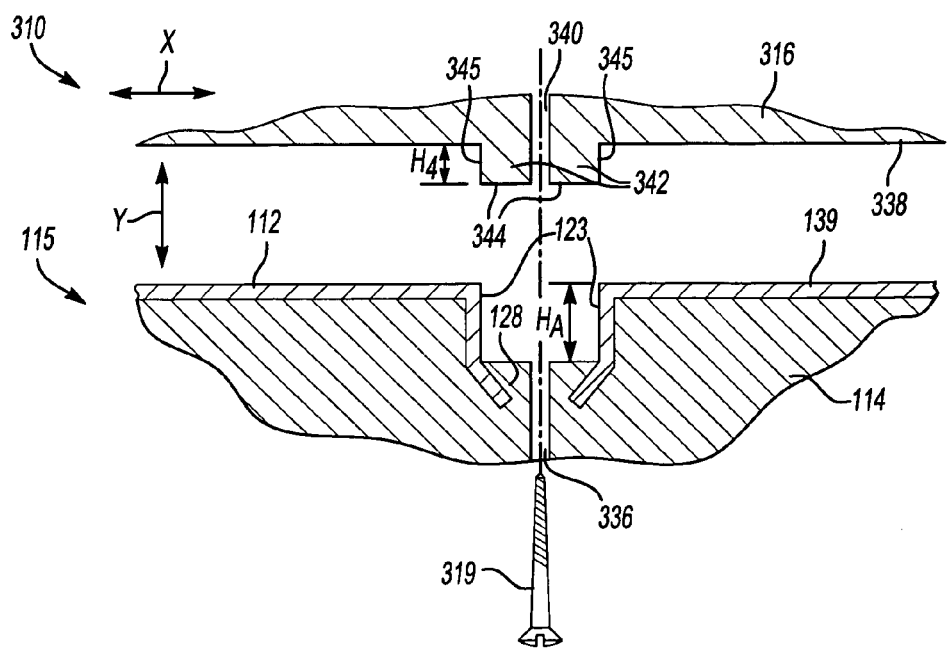
FIG. 7 shows a further embodiment of the present invention.

With reference to FIG. 7, there is shown an assembly 310 including the subassembly 115 of FIG. 5 and a window regulator motor 316 having an outer surface 338 and a protuberant part 342 which has an end surface 344 and side surface 345. The distance between the end surface 344 and the outer surface 338 is $H_4$, which is less than $H_A$.

Alignment in the Y direction is determined by contact between the outer surface 338 and the inner surface 139, and there is no contact between the heat staked portion surface 129 and the end surface 344. Hence, the alignment in the Y direction between the window regulator housing 114 and the window regulator motor 316 is only sensitive to tolerances on the thickness of the door panel 112.

Consideration of FIG. 7 shows that, as in the previous embodiment, alignment in the X direction between the window regulator motor 316 and the window regulator housing 114 is provided by co-operation between the internal side wall 130 and the outside surface 121 of the protrusive part 118 and also by co-operation between the inside surface 123 of the protrusive part 118 and the side surface 345 of the protuberant part 342.

It is important to recognize in this embodiment, that as previously described, the feature (in the form of the protrusive part 118) serves to align the door panel 112 (the first component) with the window regulator housing 114 (the second component), the protrusive part then being deformed to secure these components together to provide the subassembly 115. The feature (the protrusive 118) co-operates with the window regulator motor 316 (the third component) to provide alignment between the second and third components.

In this embodiment, the subassembly 315 includes a clearance hole 336, and the window regulator motor 316 includes a pilot hole 340. The diameter of hole 336 is greater than that of hole 240.

The subassembly and the window regulator motor are secured using a fourth component in the form of a self tapping screw 319, the self tapping screw passing through hole 336 and screwing into hole 340, so as to releaseably secure the window regulator to the subassembly. Note that hole 340 is utilized to provide a lead-in for the self tapping screw.

Note that in other embodiments, the diameter of hole 336 may be smaller than that of hole 340, in which case the self tapping screw passes through hole 336 and screws into hole 340, so as to releaseably secure the window regulator to the subassembly. Note that in this case, the hole 336 is utilized to provide a lead-in for the self tapping screw.

As in the embodiments described in FIGS. 5 and 6, the accessibility of the assembly 310 determines which of the subassembly and the window regulator motor holes is greater since access to the head of the self tapping screw is required.

Note that in further embodiments, the assembly is not restricted to door panels, window regulator motors and window regulator housings, and is equally applicable to assemblies in which at least two components are required to be aligned and/or secured relative to each other.

Furthermore other deformation techniques exist, such as the bombardment of the component by ultrasonic waves, to increase plasticity, followed by a suitable upset tool to achieve the desired final form. Alternatively it is also possible to mechanically deform the component without the need of an external energy source such as ultrasonic waves or heat. This would require a suitably configured upset tool and mechanical deformation process.

In further embodiments, the deformed portion and/or alignment feature may be non-circular in cross section, e.g. hexagonal or square, as opposed to the cylindrical/frustoconical sections described in the embodiments of FIGS. 1 to 7. The use of non-circular cross sections would prevent rotation between the various components.

In further embodiments, there could be two or three or four or more deformed portions and/or two or three or four or more alignment features. The deformed portions and/or alignment features are provided at spaced locations and thus prevent rotation of the various components. Where there are 3 or more deformed portions or alignment features, these need not be positioned on a straight line.

Note that door panels 12 and 112 are in a substantially vertical plane, and that with the window regulator motor and the window regulator housing assembled either side of the door panel, both the protuberant parts 42, 142, 242, and 342 and the feature 18,118 extend in a horizontal plane relative to the door panel.

The feature is therefore able to provide resistance to shear loads transferred via the window regulator motor and/or the window regulator housing and the protuberant part is able to provide resistance to shear loads transferred via the door panel. These shear loads act as a result of the motion of the vehicle, as well as due to the weight of the window regulator motor and the window regulator housing with respect to the feature, and the door panel with respect to the protuberant part.

With the assembly in, for example, the front and/or rear doors, shear forces due to the vehicles motion will be due to braking and accelerating, and also due to bump loads as a result of the road surface. With the assembly in, for example, a rear tailgate, shear forces will result from bump loads and also cornering loads.

It will be appreciated that it is the loads which act parallel to the door panel which result in shear forces in the feature/protuberant part. Hence, cornering loads, which act normal to the direction of travel of the vehicle, will not provide any shear force in the feature/protuberant part when the assembly is in the front and rear doors. Similarly, braking and accelerating forces, which act in the same direction as the direction of travel of the vehicle, will not provide any shear force in the feature/protuberant part when the assembly is in the rear tailgate.

As a result of the horizontal extent of the feature and the protuberant part, shear loads will not act solely on the fourth component, for example, a bolt, or a self tapping screw, and hence the fourth component is less likely to fail.

In further embodiments the deformed portions could be integral with the first component or it could be a separate component such as a plastics rivet.

The foregoing description is only exemplary of the principles of the invention.

Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An assembly comprising:
a door panel;
a window regulator housing component; and
a window regulator drive system component, wherein said door panel is secured to said window regulator housing component by a deformed portion of the window regulator housing component to provide a subassembly, wherein said deformed portion is utilized to releaseably secure said window regulator drive system component to said subassembly via a fourth component.

2. The assembly according to claim 1 in which said door panel includes a feature which ensures alignment between said door panel and said window regulator housing component.

3. The assembly according to claim 2 in which said deformed portion is formed from a pre-deformed portion, said deformed portion co-operating with an associated region of said door panel to provide said subassembly, which during assembly of said door panel and said window regulator housing component, wherein said feature aligns said door panel and said window regulator housing component while said pre-deformed portion is remote from said associated region.

4. The assembly according to claim 1 in which at least one of said door panel, said window regulator housing component, and said window regulator drive system component has a hole to allow passage of said fourth component.

5. The assembly according to claim 2 in which said feature ensures alignment between said subassembly and said window regulator drive system component.

6. The assembly according to claim 5 in which said window regulator drive system component includes a second hole with a second hole diameter, and said window regulator drive system component includes a third hole with a third hole diameter.

7. The assembly according to claim 6 in which said second hole diameter is greater than said third hole diameter.

8. The assembly according to claim 6 in which said third hole diameter is greater than said second hole diameter.

9. The assembly according to claim 6 in which said second bole diameter is equal to said third hole diameter.

10. The assembly according to claim 5 in which at least one of said second hole and said third hole is threaded.

11. The assembly according to claim 1 in which said fourth component is one of a self tapping screw, a bolt, and a nut and a bolt.

12. The assembly according to claim 1 in which said window regulator housing component includes a recess and said recess includes said deformed portion.

13. The assembly according to claim 1 in which at least one of said door panel, said window regulator housing component and said window regulator drive system component is a plastic component.

14. The assembly according to claim 13 in which said plastic component is integral with said deformed portion.

15. The assembly according to claim 1 in which said door panel lies in a substantially vertical plane.

16. The assembly according to claim 15 in which said door panel includes a feature which ensures alignment between said door panel and said window regulator housing component and said feature has a horizontal extent to resist loads acting in planes parallel to said door panel.

17. The assembly according to claim 1 in which said window regulator housing component is part of a window regulator drive system mechanism.

18. The assembly according to claim 1 in which said deformed portion forms a seal between said door panel and said window regulator housing component.

19. The assembly according to claim 1 in which said deformed portion is non-circular in cross section to prevent rotation of at least one of said door panel, said window regulator housing component and said window regulator drive system component relative to another of said door panel, said window regulator housing component and said window regulator drive system component.

20. The assembly according to claim 2 in which said feature is non-circular in cross section to prevent rotation of at least one of said door panel, said window regulator housing component and said window regulator drive system component relative to another of said door panel, said window regulator housing component and said window regulator drive system component.

21. The assembly according to claim 1 further including at least one further deformed portion at a spaced location from said deformed portion, in which said door panel is further secured to said window regulator housing component by said at least one further deformed portion.

22. A method of assembling an assembly having a door panel, a window regulator housing component having a portion, a window regulator drive system component, and a fourth component, the method comprising:
securing said door panel to said window regulator housing component by deforming said portion into a deformed portion to form a subassembly having said door panel and said window regulator housing component; and
releaseably securing said window regulator drive system to said subassembly using said deformed portion in conjunction with the fourth component to form the assembly.

23. The method as defined in claim 22, wherein a region of the window regulator drive system component engages said deformed portion to align the window regulator drive system component with the subassembly.

24. The method as defined in claim 22 wherein the fourth component releaseably engages said deformed portion to releaseably secure said window regulator drive system component to the subassembly.

25. The method as defined in claim 22, wherein said deformed portion includes a hole through which the fourth component passes to releaseably secure the window regulator drive system component to said subassembly.

* * * * *

UNITED STATES PATENT AND TRADEMARK OFFICE
CERTIFICATE OF CORRECTION

PATENT NO. : 7,069,696 B2 Page 1 of 1
APPLICATION NO. : 10/010739
DATED : July 4, 2006
INVENTOR(S) : Lawrie et al.

It is certified that error appears in the above-identified patent and that said Letters Patent is hereby corrected as shown below:

Claim 9, Column 7, line 50: "bole" should be --hole--

Signed and Sealed this

Twenty-first Day of November, 2006

JON W. DUDAS
*Director of the United States Patent and Trademark Office*